United States Patent

Yamamoto et al.

[11] Patent Number: 5,528,497
[45] Date of Patent: Jun. 18, 1996

[54] VEHICLE STEERING CONTROL SYSTEM

[75] Inventors: Yorihisa Yamamoto; Yutaka Nishi; Takashi Nishimori, all of Saitama-ken, Japan

[73] Assignee: Honda Giken Kogyo Kabushiki Kaisha, Tokyo, Japan

[21] Appl. No.: 122,615

[22] Filed: Sep. 16, 1993

Related U.S. Application Data

[63] Continuation-in-part of Ser. No. 950,081, Sep. 23, 1992.

[30] Foreign Application Priority Data

Sep. 16, 1992 [JP] Japan .................................... 4-273829
Sep. 16, 1992 [JP] Japan .................................... 4-273830
Sep. 16, 1992 [JP] Japan .................................... 4-273831

[51] Int. Cl.⁶ ........................................................ B60K 41/00
[52] U.S. Cl. .................................... 364/424.05; 180/446
[58] Field of Search ................................ 180/233, 79.1, 180/140; 74/866; 364/424.05, 424.01

[56] References Cited

U.S. PATENT DOCUMENTS

| | | | |
|---|---|---|---|
| 4,830,127 | 5/1989 | Ito et al. | 364/424.01 |
| 4,858,134 | 8/1989 | Eto et al. | 364/424.05 |
| 4,875,540 | 10/1989 | Oshita et al. | 180/79.1 |
| 4,909,343 | 3/1990 | Mouri et al. | 180/142 |
| 4,966,249 | 10/1990 | Imaseki | 364/424.01 |
| 5,014,802 | 5/1991 | Knoll et al. | 364/424.05 |
| 5,094,127 | 3/1992 | Ishida et al. | 74/866 |
| 5,097,917 | 3/1992 | Serizawa et al. | 180/79.1 |
| 5,225,984 | 7/1993 | Nakayama | 364/424.05 |
| 5,236,335 | 8/1993 | Takeuchi et al. | 180/79.1 |
| 5,247,441 | 9/1993 | Serizawa et al. | 364/424.05 |
| 5,347,458 | 9/1994 | Serizawa et al. | 364/424.05 |
| 5,388,658 | 2/1995 | Ando et al. | 180/197 |

*Primary Examiner*—Kevin J. Teska
*Assistant Examiner*—Stephen J. Walder, Jr.
*Attorney, Agent, or Firm*—Weiner, Carrier & Burt; Joseph P. Carrier; Irving M. Weiner

[57] ABSTRACT

In a vehicle steering control system, an actuating torque is applied to steerable wheels according to a steering torque applied to a steering wheel in a conventional manner, and an additional actuating torque is applied to the steering wheel by an electric motor according to lateral dynamic conditions of the vehicle so as to control the lateral stability of the vehicle even in the presence of external interferences such as crosswind. Such external interferences are detected as a lateral dynamic condition of the vehicle such as the yaw rate of the vehicle, and the steering control system produces a steering reaction which counteracts such a lateral dynamic condition by applying the additional actuating torque to the steerable wheels so that the vehicle may maintain a straight course in spite of such external interferences without requiring any intentional efforts by the vehicle operator. By appropriate selection of the gain of the system for generating the additional actuating torque, this advantage can be gained without causing any excessive reaction when the vehicle is undergoing a normal turning maneuver.

14 Claims, 15 Drawing Sheets

(A)

(B)

VEHICLE STEERING CONTROL SYSTEM

RELATED APPLICATIONS

This is a continuation-in-part of Ser. No. 950,081 filed Sep. 23, 1992 for "MOTOR VEHICLE STEERING SYSTEM WITH AUTOMATIC DISTURBANCE SUPPRESSION".

TECHNICAL FIELD

The present invention relates to a vehicle steering control system, and in particular to a steering control system capable of producing a steering torque that tends to control the irregular behavior of the vehicle when the vehicle is subjected to crosswind or other external interferences.

BACKGROUND OF THE INVENTION

Conventionally, the power steering system is known, and according to the power steering system disclosed in Japanese patent publication No. 50-33584, the steering effort or torque applied to a steering wheel is assisted by an output torque from an electric motor. The gain of the system for the signal obtained by detecting the steering torque applied to the steering wheel by the vehicle operator is varied according to the vehicle speed and the road condition, and the output torque of the assisting electric motor is accordingly changed so that the optimum actuating torque which actually steers the front wheels may be obtained at all times.

When the vehicle is abruptly subjected to a strong crosswind while travelling a straight course, the vehicle may deviate from the intended straight path of travel. In such a case, it is necessary to apply a counteracting force to the steerable wheels so as to oppose such interferences. However, according to such a conventional power steering system, when the vehicle has started deviating from the intended path as a result of crosswind, because the electric motor can produce an actuating torque only when the vehicle operator applies a steering torque to the steering wheel, the electric motor cannot produce any actuating torque unless the vehicle operator intentionally takes a corrective action.

To control the deviation of the vehicle from the intended straight path, the vehicle operator must apply a corrective steering torque to the steering wheel. However, according to the conventional power steering system, the required steering torque increases as the lateral acceleration and the yaw rate of the vehicle increase, and, accordingly, the steering torque required for counteracting the deviation of the vehicle due to external interferences increases as the lateral acceleration and the yaw rate of the vehicle increase.

Furthermore, the conventional power steering system requires a very small steering torque for its operation, but the vehicle operator receives very little feedback from the steering wheel with regard to the behavior of the vehicle. Therefore, the vehicle operator must depend on his vision and bodily sense of acceleration in assessing the condition of the vehicle when it is subjected to external interferences. As a result, the counter-action by the vehicle operator tends to be delayed, and, therefore, tends to be excessive.

To overcome such problems, it is conceivable to detect the irregular behavior of the vehicle due to external interferences from the yaw rate of the vehicle, and produce a force counteracting the irregular behavior of the vehicle by using an assisting motor so that the irregular behavior of the vehicle may be controlled.

However, according to such a control system based on the use of an electric motor, because the system cannot determine whether the detected yaw rate is due to an intentional steering maneuver or due to external interferences, the electric motor always produces a steering torque which tends to control the yaw rate or which tends to restore the vehicle back to the straight ahead path of travel irrespective of the cause of the yawing movement. As a result, the steering reaction which the electric motor produces may become excessive when the vehicle is making a normal turn. If the control parameters are modified so that the steering reaction may be appropriate at the time of normal steering maneuver, the vehicle may not be sufficiently protected from external interferences.

BRIEF SUMMARY OF THE INVENTION

In view of such problems of the prior art and recognition by the inventors, a primary object of the present invention is to provide an improved vehicle steering control system which is capable of controlling the deviation of the vehicle from an intended path of travel and maintaining a straight ahead direction even when the vehicle is subjected to disturbances such as crosswind.

A second object of the present invention is to provide an improved vehicle steering control system which is capable of controlling the deviation of the vehicle from an intended path of travel even when the vehicle is subjected to disturbances such as crosswind, and maintaining the steering torque required for the steering maneuver at an appropriate level.

A third object of the present invention is to provide a vehicle steering control system which can maintain the vehicle on a straight path even when the vehicle is subjected to disturbances such as crosswind, without requiring any efforts from the operator of the vehicle.

According to the present invention, these and other objects can be accomplished by providing a vehicle steering control system, comprising steering torque input means; powered steering control means for applying a first actuating torque to steerable wheels of a vehicle according to a steering torque applied to the steering torque input means; means for detecting a lateral dynamic condition of the vehicle; and active reaction generating means for applying a second actuating torque to the steerable wheels so as to control a turning movement of the vehicle according to a signal supplied from the detecting means; whereby an overall actuating torque applied to the steerable wheels comprises a sum of the first and second actuating torques provided by the powered steering control means and the active reaction generating means. The lateral dynamic condition may include such parameters as the yaw rate and the lateral acceleration of the vehicle and their time derivatives.

Thus, the irregular movement of the vehicle is detected in terms of the yaw rate or the lateral acceleration of the vehicle caused by external interferences, and the actuating torque for the steerable wheels counteracting the irregular movement can be produced by the active reaction generating means. In particular, when the second actuating torque provided by the active reaction generating means comprises a component which depends on a change rate of the lateral dynamic condition of the vehicle detected by the detecting means, the response of the steering control system is speeded up, and a favorable transient property can be obtained.

Preferably, a contribution of the second actuating torque to the overall actuating torque increases as a vehicle speed increases because higher vehicle speed means greater influences from the external interferences, and the compensatory action must be increased as the vehicle speed is increased.

According to a preferred embodiment of the present invention, the second actuating torque provided by the active reaction generating means is greater near a neutral point of the steering torque input means than in a larger steering angle range of the steering torque input means. Thus, the second actuating torque produced by an electric motor or the like is diminished by the increase in the steering angle, and the vehicle operator can therefore comfortably carry out the normal turning maneuver typically involving relatively large steering angles without being hampered by any undesired excessive steering reaction.

When the vehicle is making a normal turn, it will also give rise to a yaw rate and a lateral acceleration, and a moderate steering reaction is applied by the electric motor to the steering shaft so as to restore the vehicle to a straight ahead course or the steering wheel to its neutral position. Such a steering reaction similar to the self-aligning torque, when produced at a moderate level, facilitates the vehicle operator's effort in turning the steering wheel back to its neutral position upon completion of the turning maneuver.

According to another preferred embodiment of the present invention, the second actuating torque provided by the active reaction generating means comprises a component which depends on a deviation of an actually detected lateral dynamic condition from a reference lateral dynamic condition which is predicted from a steering input to the steering torque input means. Thus, when the vehicle is travelling under normal condition, either making a turn or travelling straight ahead, the deviation is small, and the steering control system operates much in the same way as the conventional power steering system. However, when the deviation becomes substantial, for instance, due to the influences from external interferences such as crosswind, the resulting steering reaction counteracts such a deviation, and maintains the vehicle on the intended path of travel.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
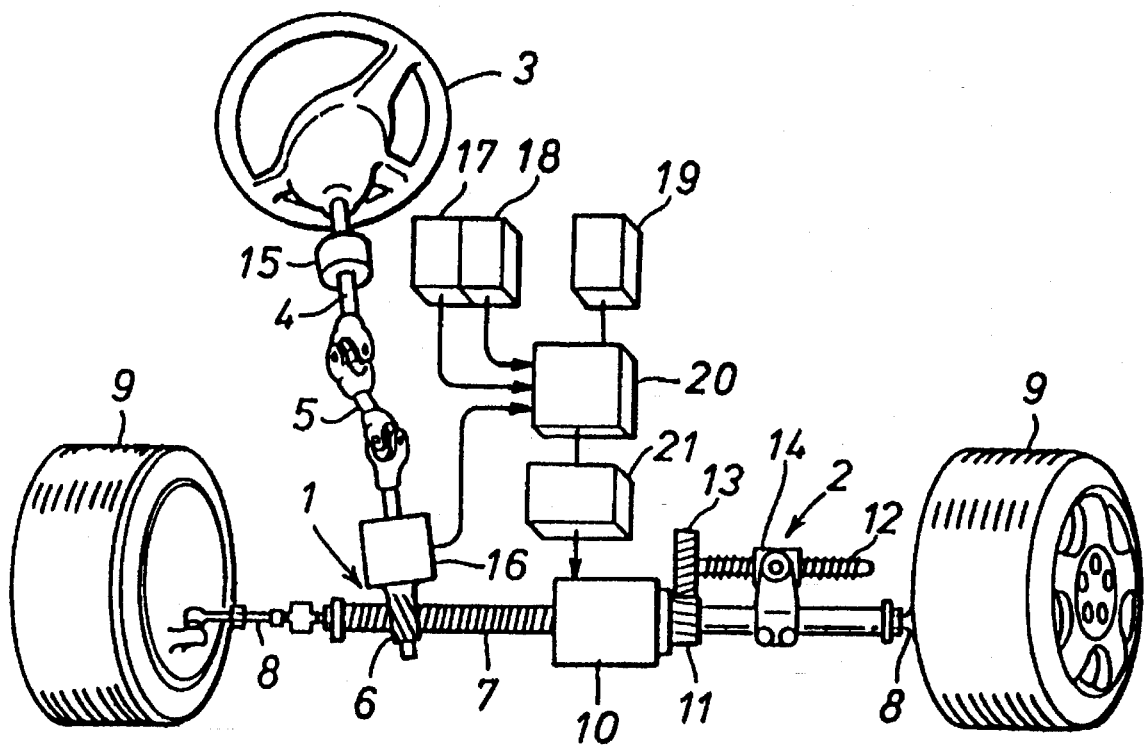
FIG. 1 is a schematic diagram generally illustrating a vehicle steering control system according to the present invention.

FIG. 1 shows the general structure of the vehicle Steering system according to the present invention. This device comprises a manual steering force generating unit 1 and an assisting steering force generating unit 2 powered by an electric motor. A steering shaft 4 integrally connected to a steering wheel 3 is connected, at its other end, to a pinion 6 of a rack and pinion mechanism via a universal joint 5. The rack and pinion mechanism further comprises a rack 7 which can move laterally of the vehicle body and meshes with the pinion 6. The two ends of the rack 7 are connected to the knuckle arms of the right and left front wheels 9 via tie rods 8, respectively. So far the structure is conventional, and the normal steering action based on the use of the rack and pinion mechanism can be accomplished.

The rack 7 is coaxially passed through an electric motor 10. More specifically, the rack 7 is passed through a hollow rotor having a drive helical gear 11 which meshes with a driven helical gear 13 mounted to an axial end of a screw shaft 12 of a ball screw mechanism extending in parallel with the rack 7. A nut 14 of the ball screw mechanism is fixedly secured to the rack 7.

The steering shaft 4 is provided with a steering angle sensor 15 for producing a signal corresponding to the rotational angle of the steering wheel 3 and a torque sensor 16 for producing a signal corresponding to a steering torque applied to the steering shaft 4.

The vehicle body carries a lateral acceleration sensor 17 for producing a signal corresponding to the lateral acceleration applied to the vehicle body, a yaw rate sensor 18 for producing a signal corresponding to the yaw rate (angular speed of the yawing movement) of the vehicle body, and a vehicle speed sensor 19 for producing a signal corresponding to the travelling speed of the vehicle.

In this embodiment, the steering wheel 3 and the steerable wheels or the front wheels 9 are mechanically connected to each other, and a control signal obtained by processing the outputs from the various sensors 15 through 19 is supplied to the electric motor 10 via a control unit 20 and a drive circuit 21 so that the output torque of the electric motor 10 may be controlled as required.

Figure 2:
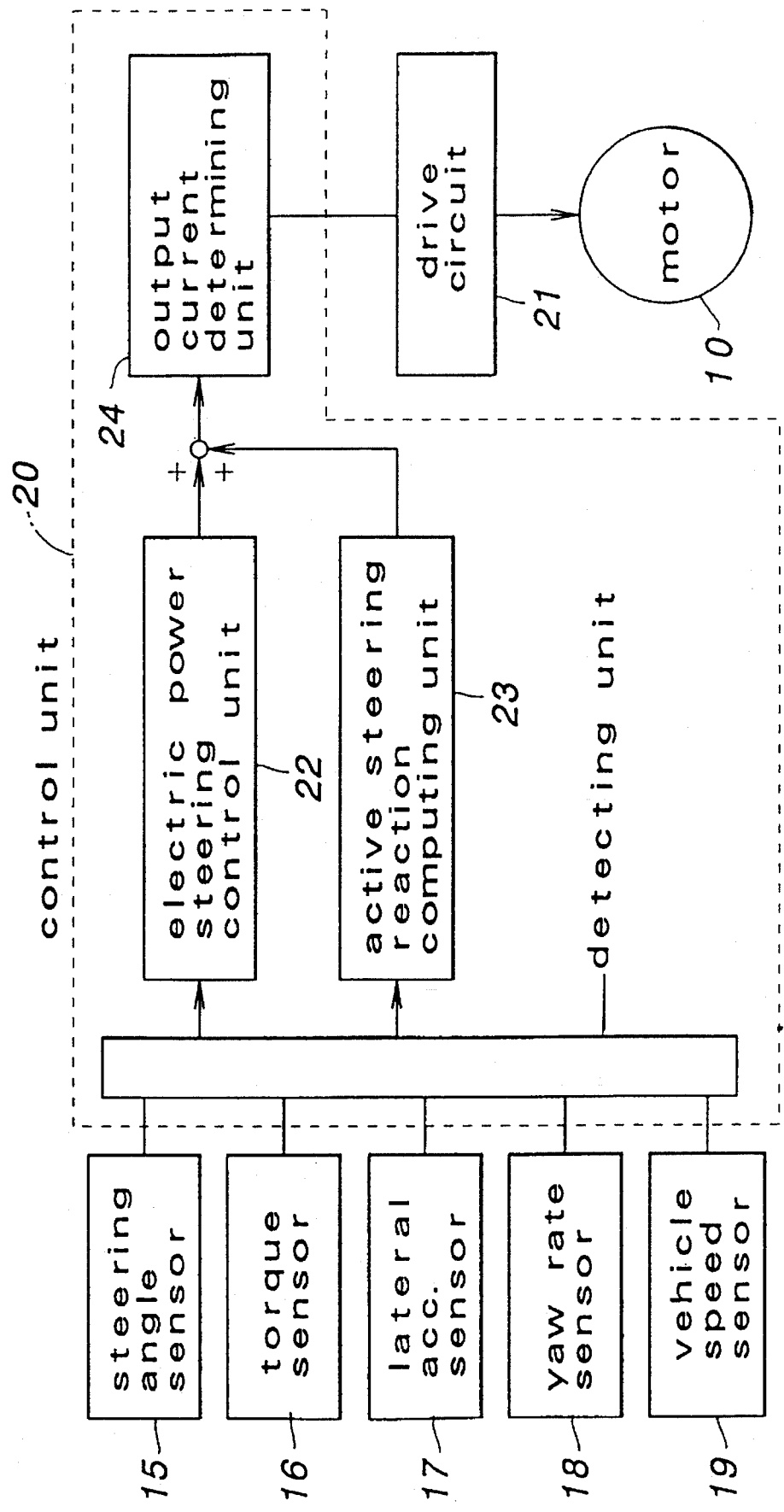
FIG. 2 is a block diagram showing the general structure of the vehicle steering control system.

FIG. 2 shows a schematic block diagram of a control system to which the present invention is applied. The control unit 20 receives the outputs from the steering angle sensor 15, the torque sensor 16, the lateral acceleration sensor 17, the yaw rate sensor 18, and the vehicle speed sensor 19. These output signals are fed to an electric power steering control unit 22 and an active steering reaction computing unit 23, and the outputs from these units are supplied to an output current determining unit 24 so that the target electric current level for the electric motor 10 may be determined.

The electric power steering control unit 22 carries out the control for the normal power assist for the steering force or the actuating torque for the steerable front wheels 9. This control unit 22 may be capable of determining the target actuating torque according to the lateral acceleration and the yaw rate.

The active steering reaction computing unit 23 computes the target actuating torque according to an algorithm which is described hereinafter. The output current determining unit 24 determines the target driving current signal which is proportional or otherwise corresponds to the deviation of the actual steering torque obtained from the torque sensor 16 from the target steering torque value. The target driving current signal is however opposite in sign to the deviation.

The target drive current value thus obtained is supplied to the drive circuit 21. This drive circuit controls the electric motor 10, for instance by PWM control, and an actually detected current value obtained from a current detection sensor is fed back to the input signal to the drive circuit 21 or the target drive current value.

Figure 3:
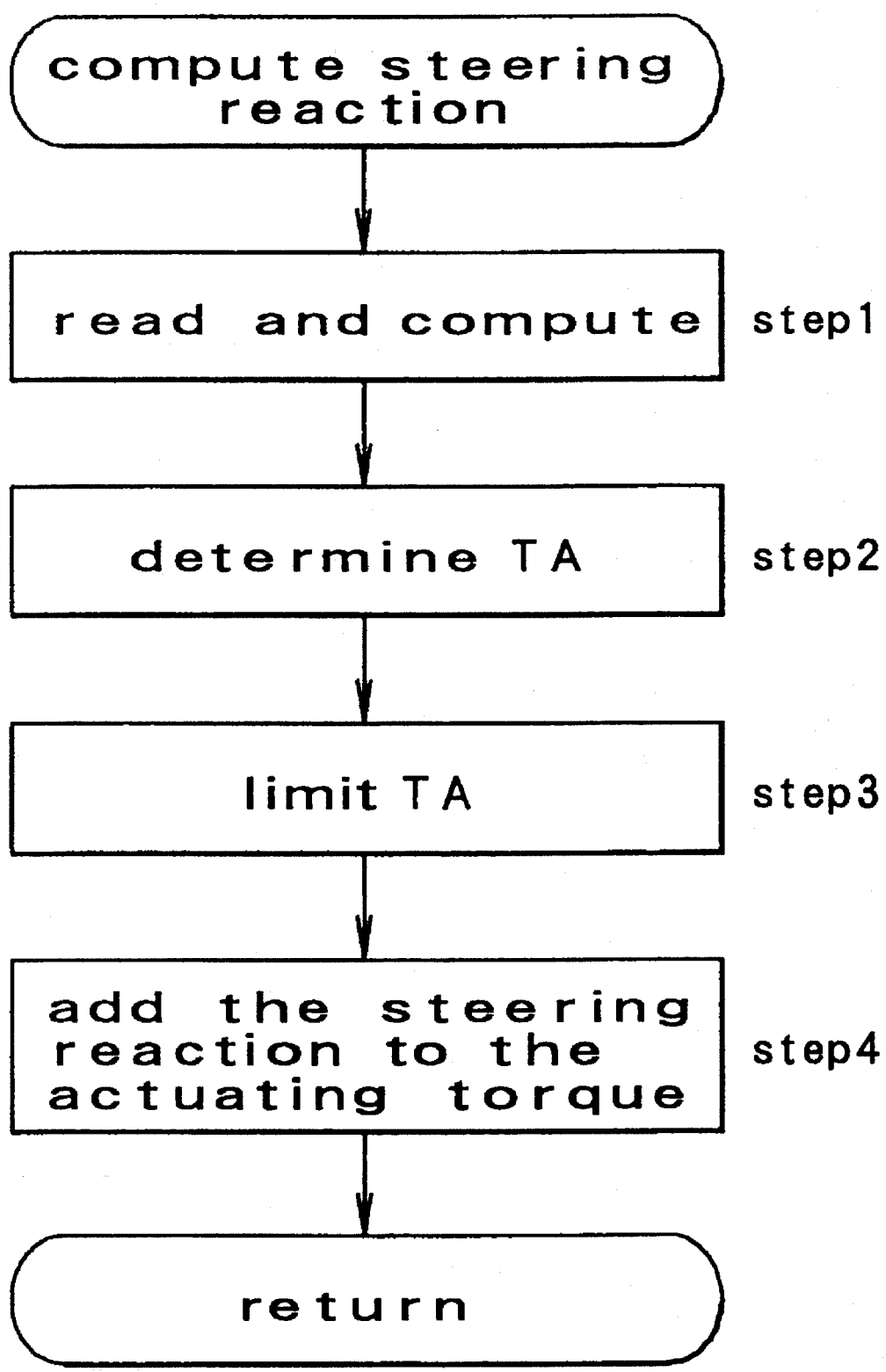
FIG. 3 is a flow chart showing the main control flow of the vehicle steering control system.

In the active steering reaction computing unit 23 in the control unit 20, the process shown by the flow chart of FIG. 3 is cyclically executed at a prescribed period. First of all, in step 1, the output signals from the various sensors are read out, and the steering angular speed and the yaw acceleration are computed. In step 2, the steering reaction TA is determined. A limit is set on the target steering reaction in step 3, and this control signal is added to the output of the electric power steering control unit 22 in step 4.

Figure 4:
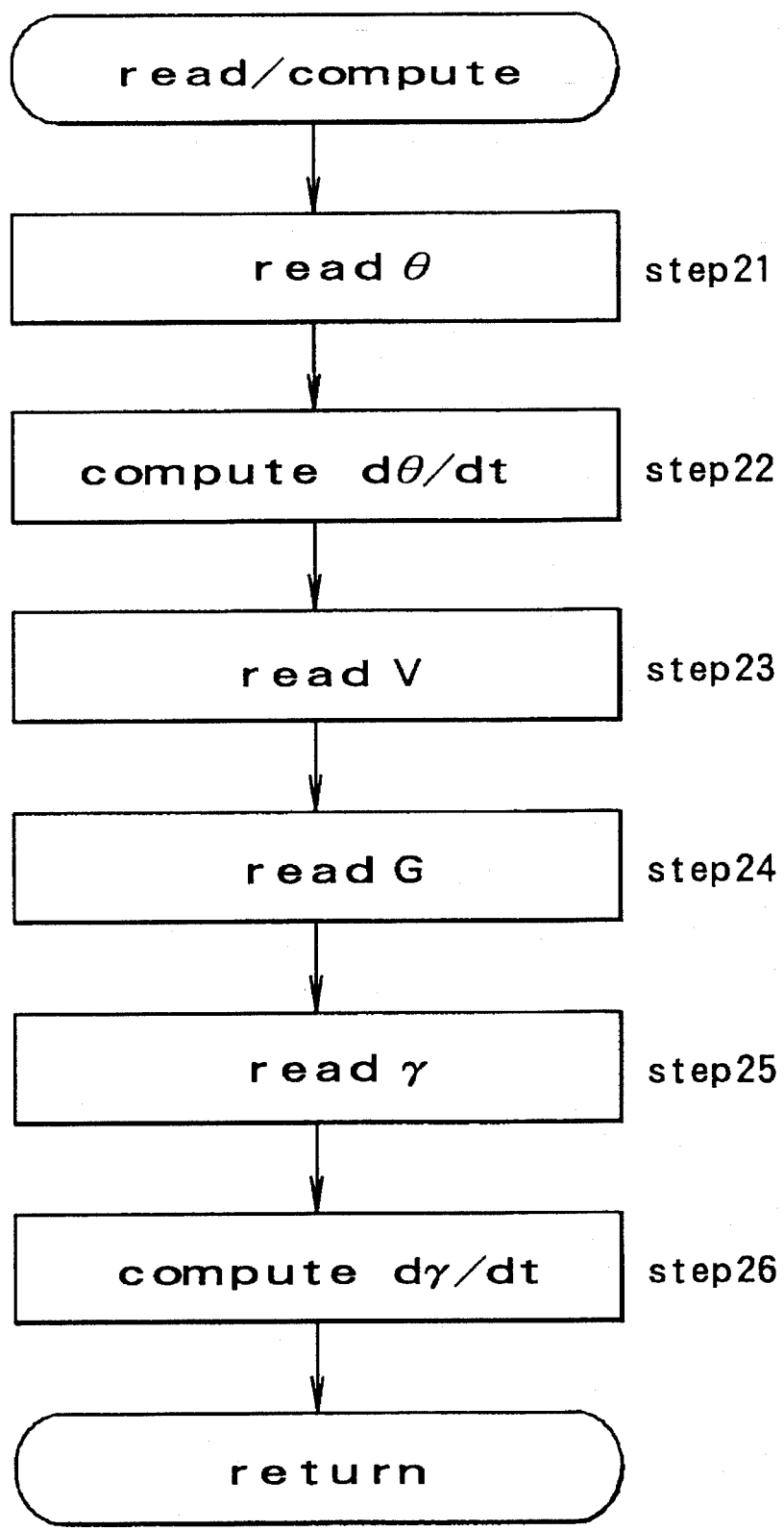
FIG. 4 is a flow chart showing step 1 of FIG. 3 in more detail.

This control process is described in more detail with reference to FIGS. 4 through 7. With reference to FIG. 4, step 1 includes the following steps. First of all, the steering angle $\theta$ is read (step 21), and the steering angular velocity $d\theta/dr$ is computed by differentiating the steering angle $\theta$ (step 22). Then, the vehicle speed V, the lateral acceleration G and the yaw rate $\gamma$ are read (steps 23 through 25). The yaw rate $\gamma$ is differentiated to obtain the yaw rate change rate (angular acceleration of the yawing movement $d\gamma/dt$) (step 26).

Figure 5:
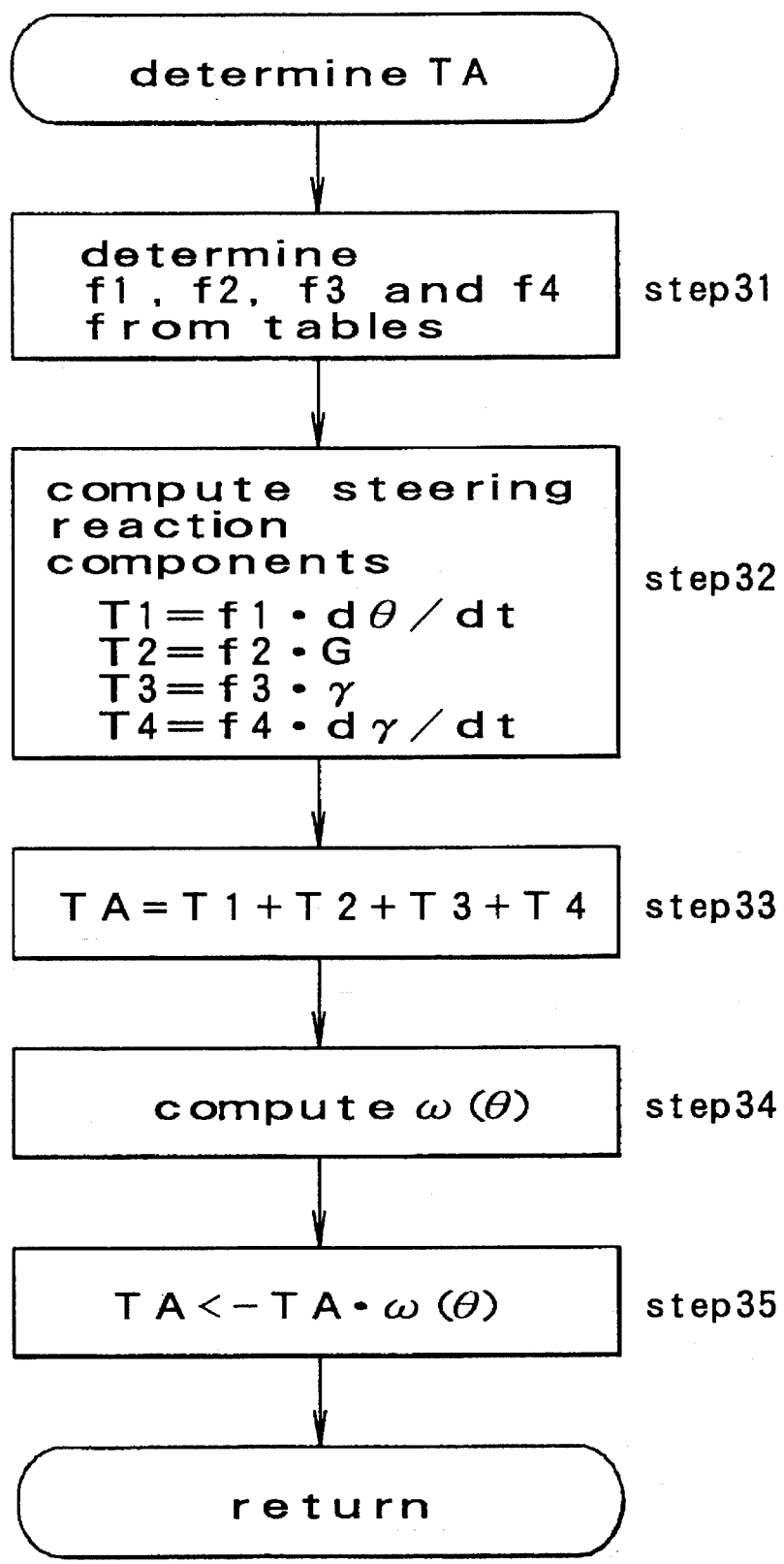
FIG. 5 is a flow chart showing step 2 of FIG. 3 in more detail.

With reference to FIG. 5, step 2 includes the following steps. The coefficients f1, f2, f3 and f4 for the steering angular velocity $d\theta/dr$, the lateral acceleration G, the yaw rate $\gamma$, and the yaw angular acceleration $d\gamma/dt$ are defined as weighting functions depending on the vehicle speed, and are obtained from data tables such as FIGS. 8(A) through 8(D) using the vehicle speed as the address (step 31), the steering reaction components T1, T2, T3 and T4 based on the contributions of these parameters are computed (step 32). The target steering reaction TA is determined by summing these steering reaction components (step 33).

The coefficients f3 and f4 for the yaw rate $\gamma$, and the yaw angular acceleration $d\gamma/dt$ are given here as linear functions of vehicle speed V because higher vehicle speed means greater influences from the external interferences, and the compensatory action must be increased as the vehicle speed V is increased.

Figure 9:
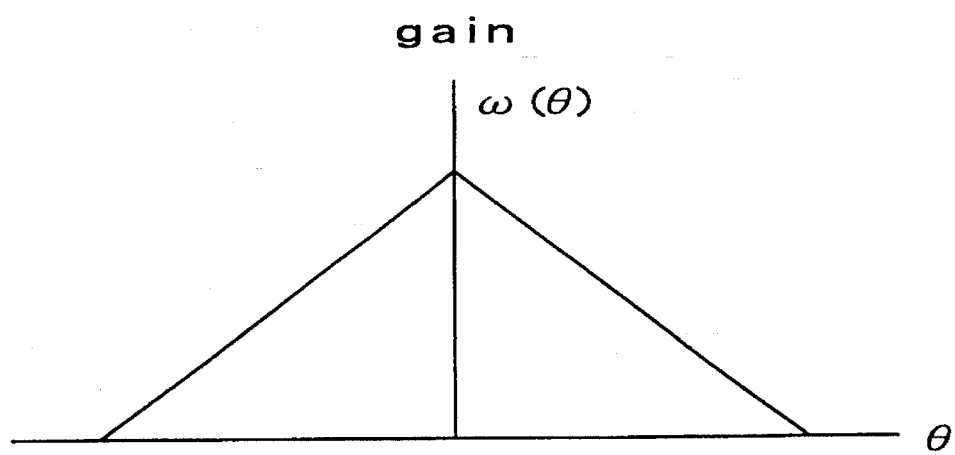
FIGS. 9(A), 9(B) show graphs representing the parameter gains of the steering reaction depending on the steering angle.
Figure 9:
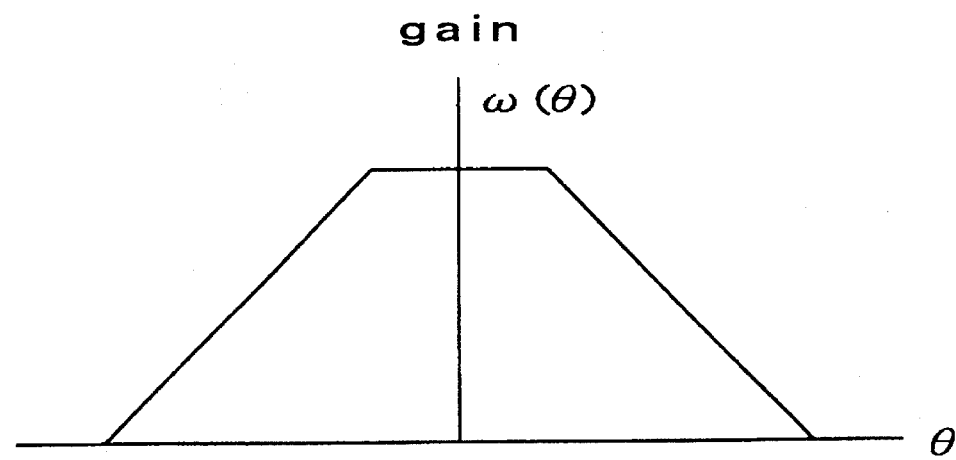

Then, a parameter gain $\omega$ ($\theta$) for the steering angle is computed (step 34), and the target steering reaction TA is modified according to the magnitude of the steering angle $\theta$ (step 35). The parameter gain $\omega(\theta)$ in this case is determined as given in FIGS. 9(A), 9(B), and is relatively higher near the neutral range, and progressively decreases as the steering angle is increased.

Figure 6:
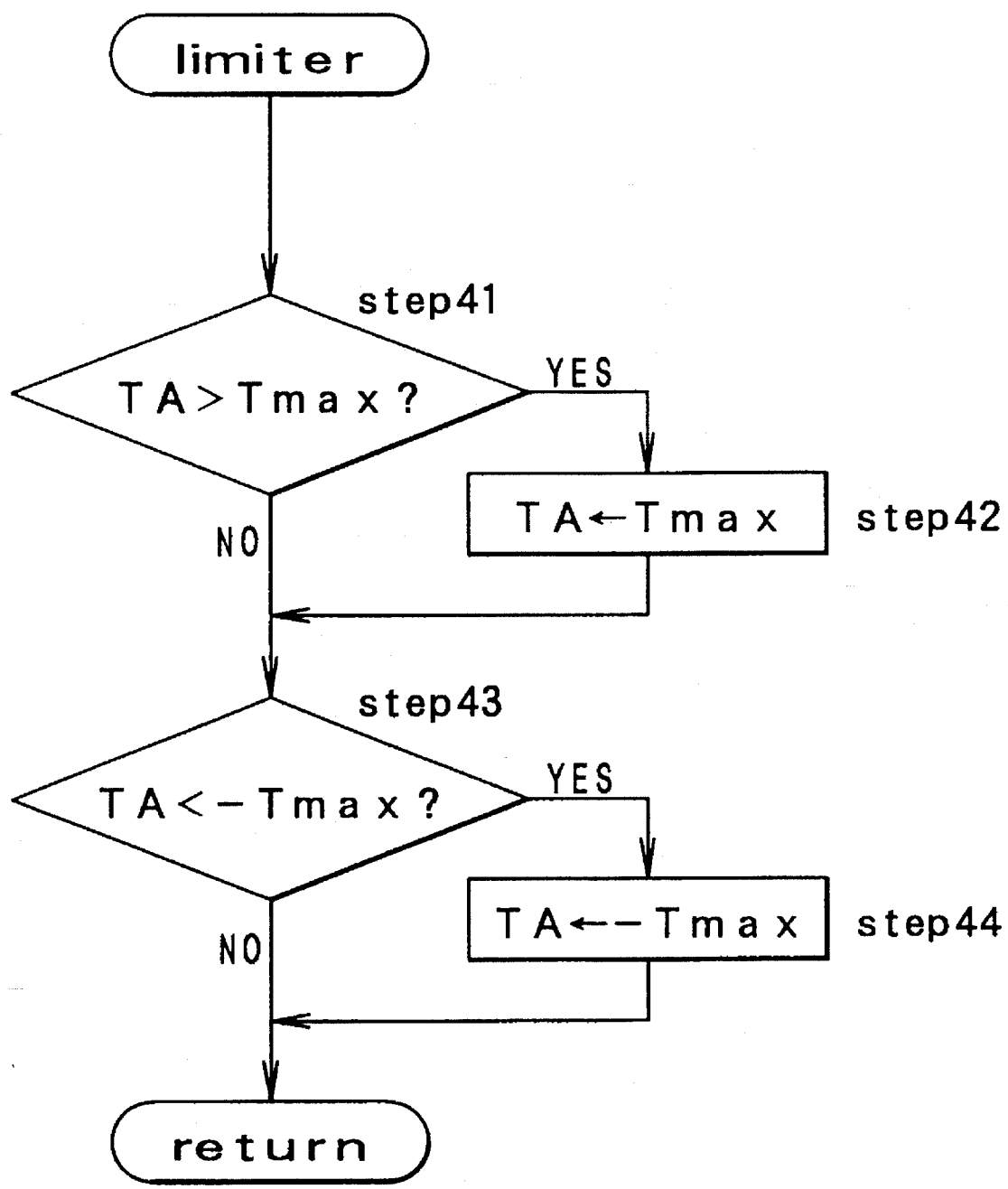
FIG. 6 is a flow chart showing step 3 of FIG. 3 in more detail.
Figure 7:
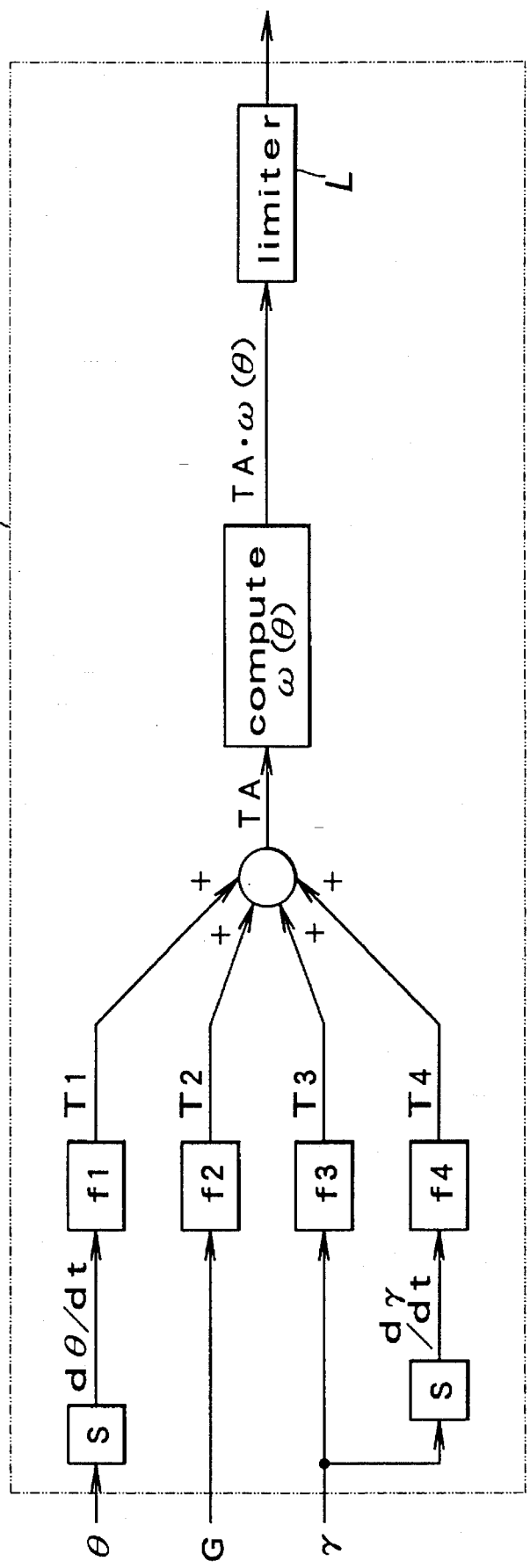
FIG. 7 is a block diagram showing the active steering reaction computing unit 23 of FIG. 2 in more detail.
Figure 8:
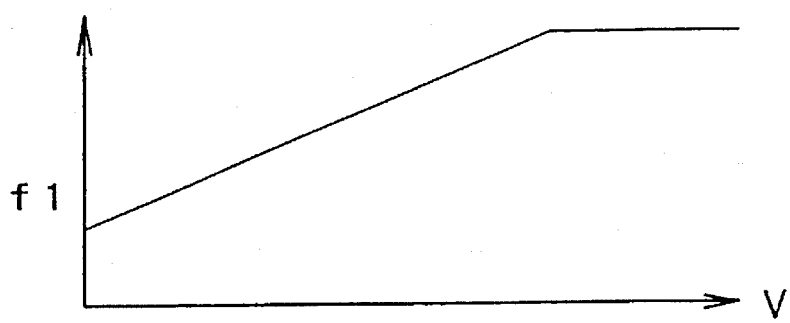
FIGS. 8*A), 8(B), 8(C), 8(D) show graphs representing the dependence of the weighting functions f1 through f4 on the vehicle speed.
Figure 8:
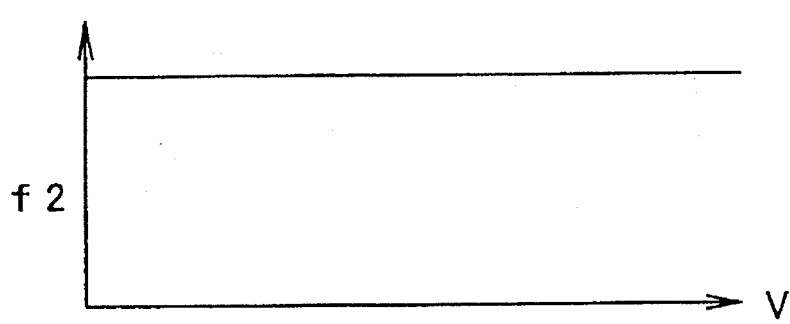
Figure 8:
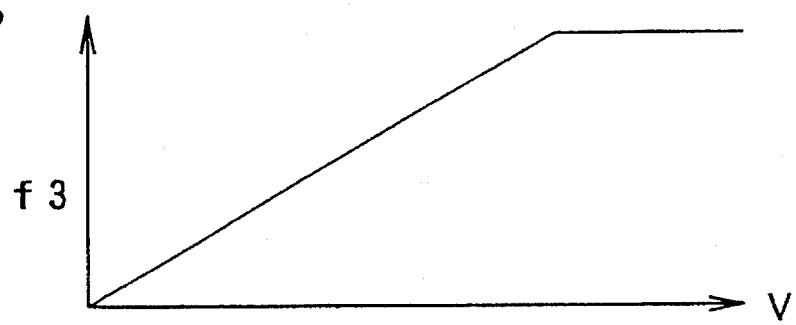
Figure 8:
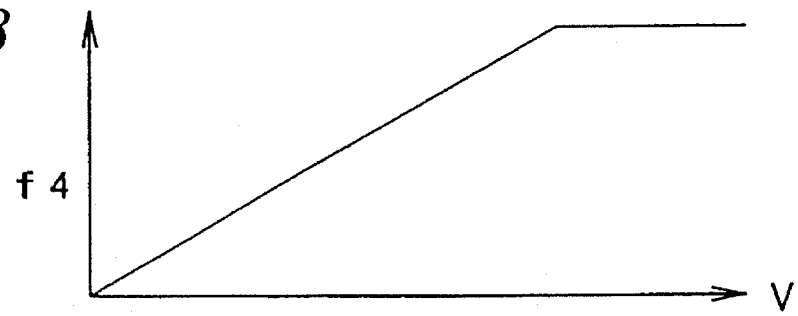

With reference to FIG. 6, step 3 includes the following steps. First of all, it is determined whether the target steering reaction TA has exceeded a prescribed level (Tmax) (step 41), and if that is the case, the target steering reaction TA is set at the prescribed maximum level Tmax (step 42). If the target steering reaction TA is lower than this prescribed level (Tmax), it is likewise determined whether the target steering reaction TA has fallen below another prescribed level (−Tmax) (step 43). If the target steering reaction TA is lower than this prescribed level −Tmax, the target steering reaction TA is set at the prescribed minimum level −Tmax (step 44). Steps 41 through 44 correspond to the action of the limiter L in FIG. 7.

The target steering reaction TA thus determined is added to the target assisting actuating torque, and the sum is converted into a target electric current level by the output current determining unit 24 to be supplied to the drive circuit 21 (FIG. 2).

Figure 10:
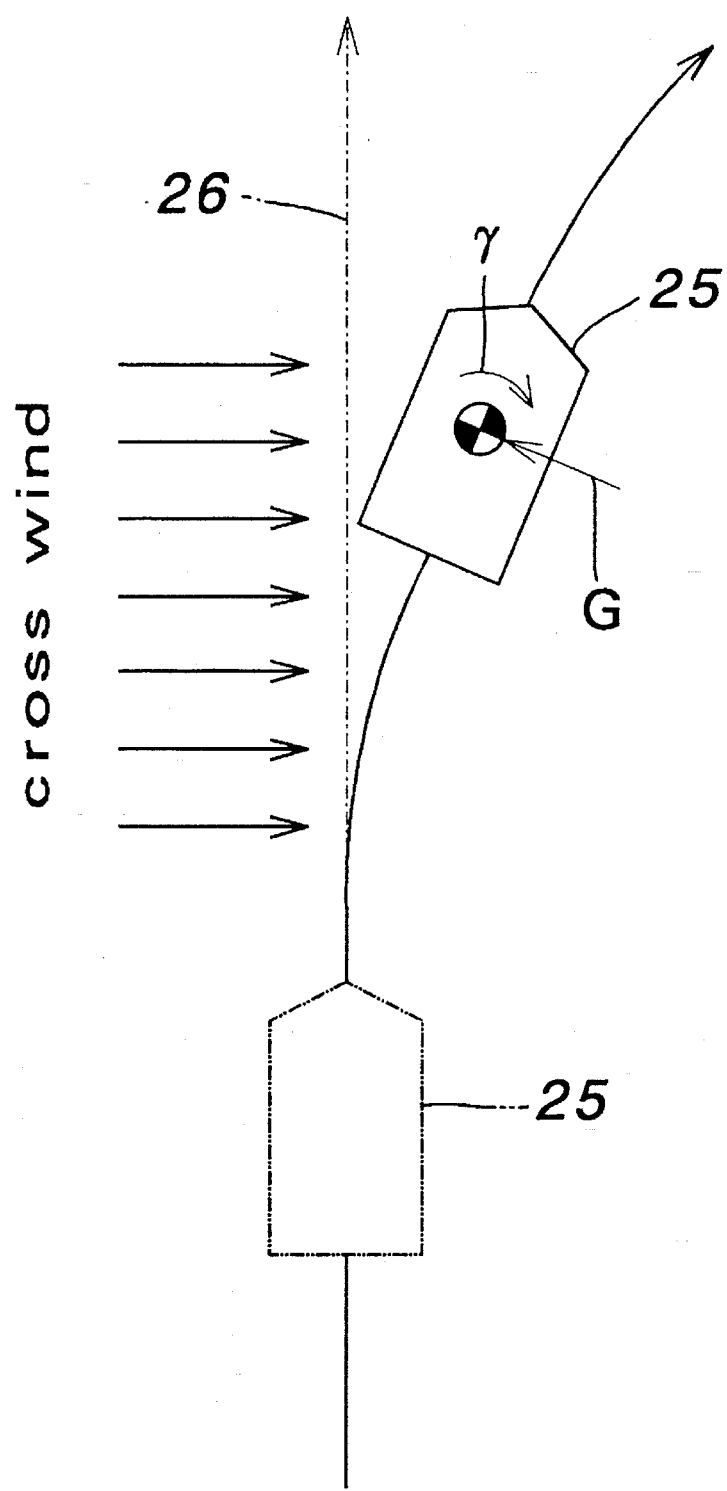
FIG. 10 illustrates the movement of the vehicle when it is travelling a straight course and abruptly subjected to crosswind.

Thus, when the vehicle 25 deviates from the intended straight path 26 due to crosswind as illustrated in FIG. 10, the lateral acceleration G and the yaw rate $\gamma$ of the vehicle are detected, and the electric motor 10 is activated in such a manner that the lateral acceleration G and the yaw rate $\gamma$ of the vehicle 25 may be cancelled even in absence of any intentional efforts to turn the steering wheel 3 by the vehicle operator, or that the deviation of the vehicle 25 from the straight path 26 may be eliminated and the vehicle 25 may be brought back on the straight path 26.

On the other hand, when the vehicle is making a turning maneuver as a result of an intentional effort by the vehicle operator without any external interferences, the turning movement of the vehicle also produces a yaw rate and a lateral acceleration. However, because the steering angle is substantially great, the reaction torque produced by the electric motor is diminished by the increase in the steering angle as described previously with reference to FIG. 9, and the vehicle operator can comfortably carry out the turning maneuver without being hampered by any undesired excessive steering reaction.

Thus, when the vehicle 25 is subjected to a yaw rate $\gamma$ and a lateral acceleration G, and the vehicle operator is not applying any steering effort to the steering wheel, the front wheels 9 are automatically steered so as to restore the vehicle 25 to the straight path without involving any irregular behavior of the vehicle. Even when the vehicle operator is holding on to the steering wheel 3, the same result can be achieved if he simply follows the movement of the steering wheel 3. During the normal cruising condition of the vehicle, the vehicle operator can sense the behavior of the vehicle from the steering torque acting upon the steering wheel or the steering reaction produced by the electric motor 10, and can therefore comfortably operate the vehicle. Furthermore, the vehicle operator can handle the vehicle at will by turning the steering wheel against the steering reaction if he wishes to intentionally do so.

Figure 11A:
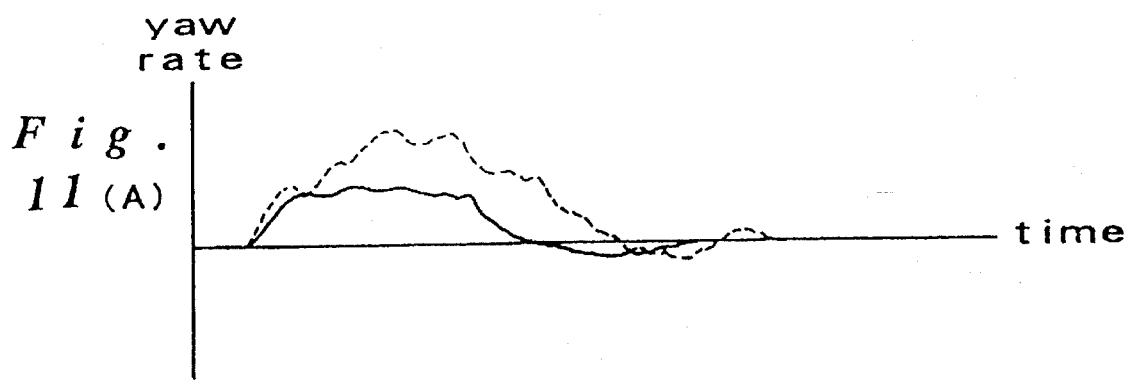
FIGS. 11(A), 11(B), 11(C), show graphs comparing the behaviors of a conventional vehicle with a vehicle equipped with the steering control system of the present invention in terms of yaw rate, steering angle and side drift.
Figure 11B:
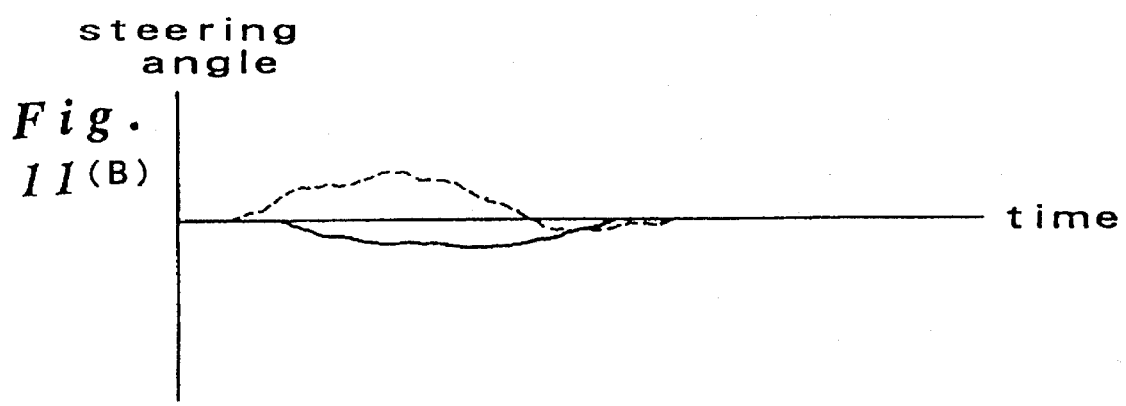
Figure 11C:
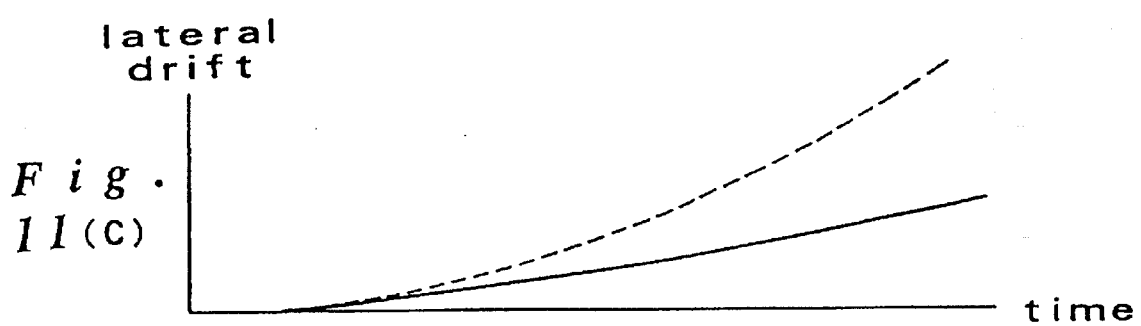

FIGS. 11(A)–11(C) show an experimental results comparing the behaviors of a conventional vehicle and a vehicle equipped with the system of the present invention. It can be seen that, according to the vehicle equipped with the steering system of the present invention, when the vehicle is subjected to interferences such as crosswind, the vehicle is automatically steered so as to control the yaw rate γ and the lateral acceleration G.

Similarly, when the vehicle is travelling a road having ruts or water pools, the steering wheel 3 is turned or receives a steering reaction as a result of the reaction of the steerable wheels to such road irregularities, but because the vehicle 25 is, in this case also, subjected to a yaw rate and a lateral acceleration as a result, the steering system of the present invention can carry out an automatic correction of the path of the vehicle back to the intended straight path.

When the vehicle is making a normal turn, it wile also give rise to a yaw rate and a lateral acceleration, and a moderate steering reaction is applied by the electric motor to the steering shaft so as to restore the vehicle to a straight ahead course or the steering wheel to its neutral position. Such a steering reaction similar to the self-aligning torque facilitates the vehicle operator's effort in turning the steering wheel back to its neutral position upon completion of the turning maneuver.

Depending on the property and the condition of the vehicle, it may demonstrate a tendency of abruptly developing an over-steer condition during a turning maneuver. However, when the vehicle is equipped with the steering system of the present invention, an abrupt increase in the yaw rate due to the abrupt onset of the over-steer condition produces a steering reaction which assists the vehicle operator's effort to counteract the over-steer condition by a compensatory steering operation. Conversely, when the vehicle develops a tendency to slip sideways, as it causes no substantial yaw movement or lateral acceleration, the vehicle operator can increase the steering angle without being hampered by the reaction force from the steering wheel.

In this embodiment, the contribution from the yaw angular acceleration was taken into consideration with the aim of improving the response of the steering system, but the differentiated value of the lateral acceleration G may be used in place of the yaw angular acceleration for similar purpose.

Thus, according to the present invention, the actuating torque that tends to control the lateral movement of the vehicle is applied to the steerable wheels and the irregular lateral movement of the vehicle due to external interferences such as crosswind can be effectively controlled without requiring any efforts on the part of the vehicle operator. The vehicle equipped with this steering control system therefore demonstrates a highly stable behavior in following a straight course. Furthermore, when this reaction is reduced as the steering angle is increased, the steering reaction during the normal turning maneuver is not undesirably increased. By proper selection of the parameters, it is possible to achieve both a favorable stability of the vehicle in its cruising condition and an appropriate level of steering reaction during normal turning maneuvers.

Furthermore, because the vehicle operator can restrain or turn the steering wheel at will against the steering reaction produced by the assisting electric motor, the handling of the vehicle is not substantially affected by the provision of the steering control system, and can sense the condition of the vehicle from the steering reaction transmitted to the steering wheel.

Figure 12:
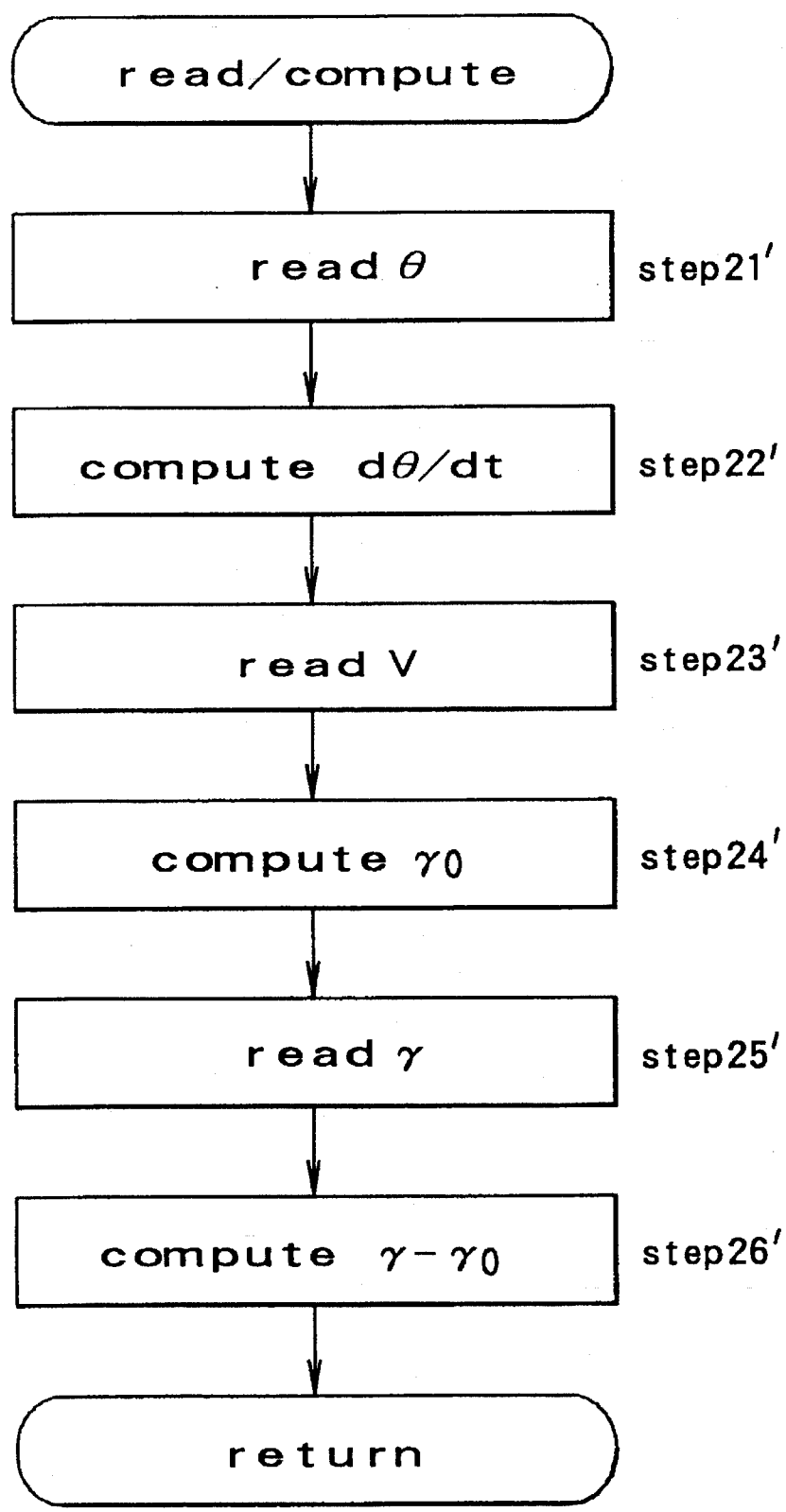
FIG. 12 is a flow chart similar to FIG. 4 showing the details of step 1 according to a second embodiment of the present invention.
Figure 13:
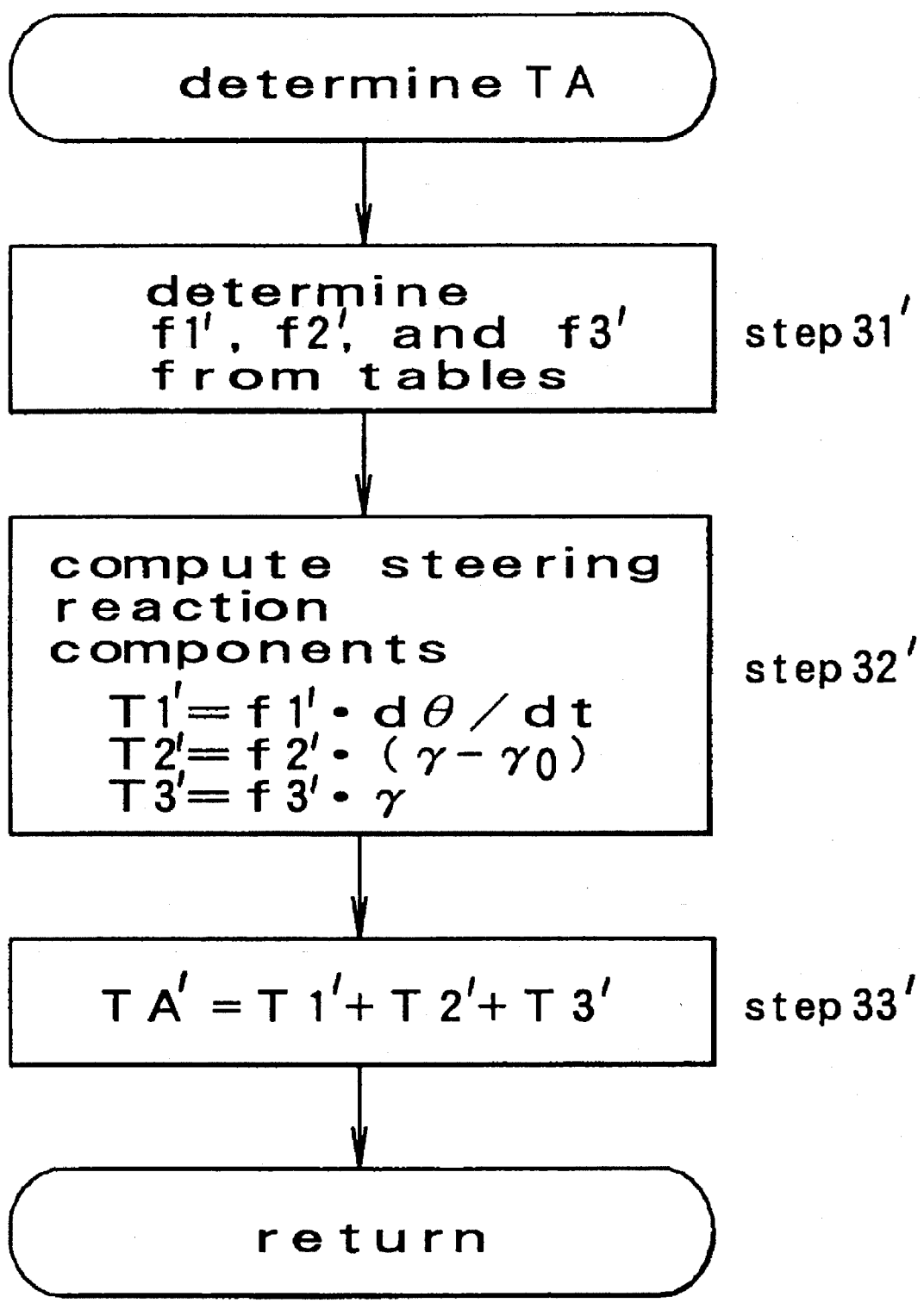
FIG. 13 is a flow chart similar to FIG. 5 showing the details of step 2 according to the second embodiment of the present invention.
Figure 14:
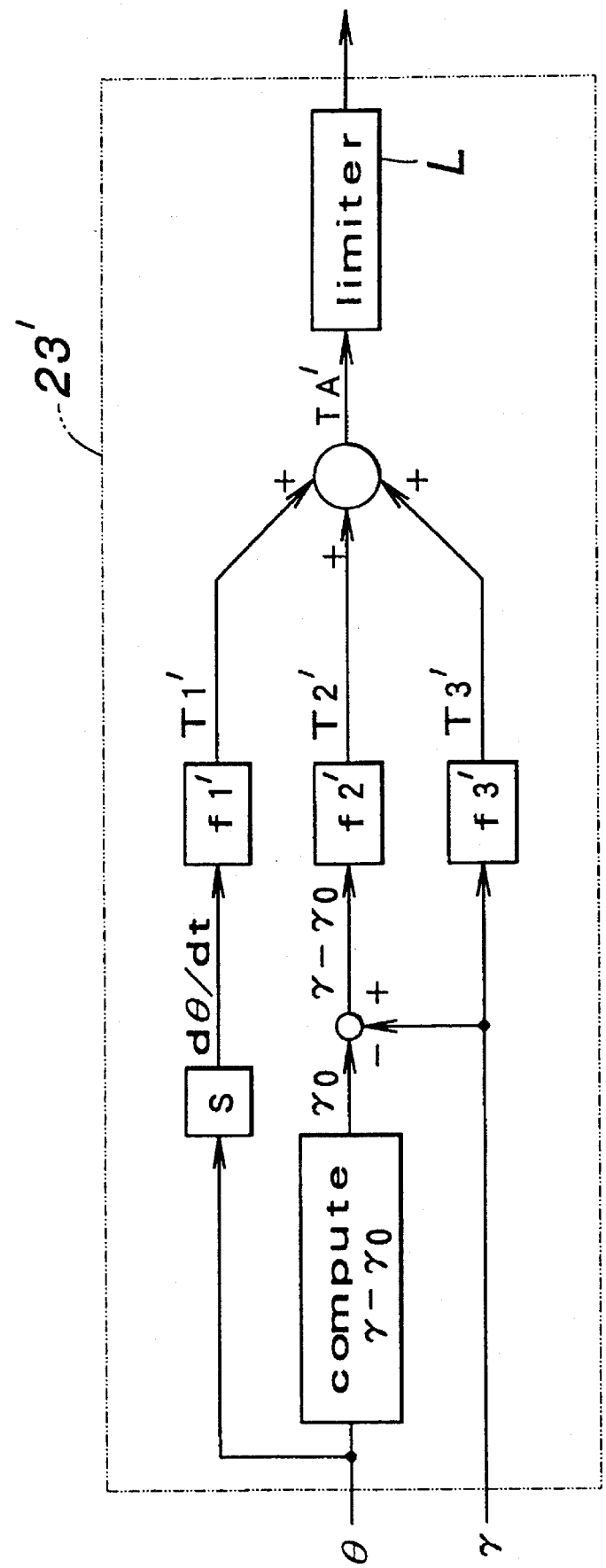
FIG. 14 is a block diagram similar to FIG. 7 showing the active steering reaction computing unit 23 of FIG. 2 according to the second embodiment of the present invention in more detail.

FIGS. 12 to 14 show a second embodiment of the present invention. In the following description, some of the parts and steps corresponding to or similar to those of the first embodiment are not described to avoid unnecessary redundancy.

In the second embodiment, step 1 is carried out in a slightly different manner from that of the first embodiment as shown in FIG. 11. First of all, the steering angle θ is read (step 21'), and the steering angular velocity dθ/dr is computed by differentiating the steering angle θ (step 22'). Then, the vehicle speed V is read (step 23'), and a reference yaw rate response model $\gamma_0$ is computed according to the previously determined transfer function of the vehicle (step 24'). Then, the current yaw rate γ is read (step 25'), and the difference or the deviation $\gamma-\gamma_0$ between the current yaw rate γ and the reference yaw rate response model $\gamma_0$ (step 26').

Figure 15A:
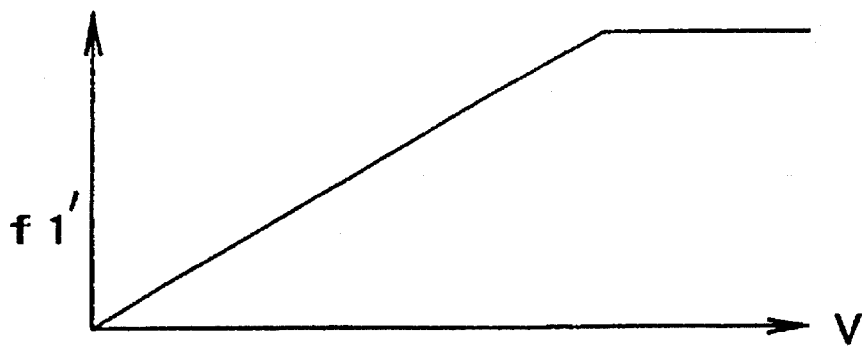
FIGS. 15(A), 15(B), 15(C) show graphs representing the dependence of the weighting functions f1 through f3 for the second embodiment of the present invention on the vehicle speed.
Figure 15B:
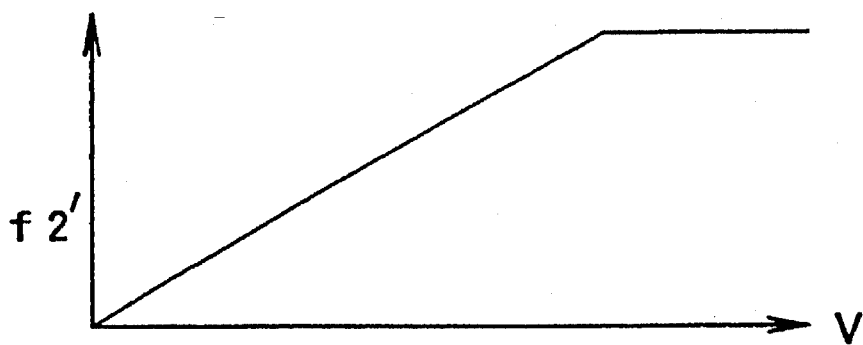
Figure 15C:
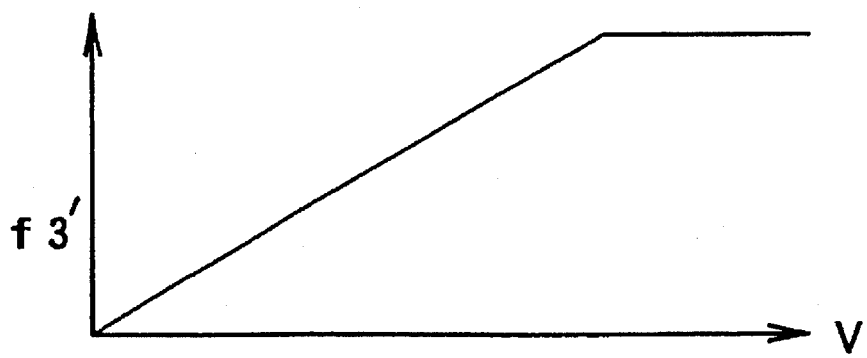

With reference to FIG. 13, step 2 includes the following steps. The coefficients f1', f2' and f3' for the steering angular velocity dθ/dr, the deviation $\gamma-\gamma_0$ between the current yaw rate γ and the reference yaw rate response model $\gamma_0$, and the current yaw rate γ are obtained from data tables such as FIGS. 15(A) through 15(C) using the vehicle speed as the address (step 31'). Thereafter, the steering reactions T1', T2' and T3' based on the contributions of these parameters are computed (step 32'). The target steering reaction TA' is determined by summing these steering reaction components (step 33'). In this embodiment, T2'>T3'.

The coefficients f1' through f3' are given here as linear functions of vehicle speed V because higher vehicle speed means greater influences from the external influences, and the compensatory action must be increased accordingly as the vehicle speed V is increased.

Step 3 is carried out as described previously with reference to FIG. 6. This process corresponds to the action of the limiter L in FIG. 14. The target steering reaction TA' thus determined is added to the target assisting actuating torque, and the sum is converted into a target electric current level by the output current determining unit 24 to be supplied to the drive circuit 21.

Thus, when the vehicle 25 deviates from the intended straight path 26 due to crosswind as illustrated in FIG. 10, the deviation $\gamma-\gamma_0$ between the current yaw rate γ and the reference yaw rate response model $\gamma_0$ is detected, and the electric motor is activated in such a manner that the deviation $\gamma-\gamma_0$ may be eliminated even in absence of any intentional efforts to turn the steering wheel 3 by the vehicle operator, or that the deviation of the vehicle 25 from the straight path 26 may be eliminated and the vehicle 25 may be brought back on the straight path 26.

Thus, even when the vehicle 25 is subjected to a yaw rate γ due to crosswind or other interferences, and the vehicle operator is not applying any steering effort to the steering wheel, the front wheels 9 are automatically steered so as to restore the vehicle 25 to the straight path without involving any irregular behavior of the vehicle. Even when the vehicle operator is holding on to the steering wheel 3, the same result can be achieved if he simply follows the movement of the steering wheel 3.

When the vehicle is making a turn without involving any substantial external interferences, some yaw rate is produced, but the deviation $\gamma-\gamma_0$ between the current yaw rate γ and the reference yaw rate response model $\gamma_0$ is so small and the contribution of the deviation to the steering reaction is therefore so small that the vehicle operator can complete the turning maneuver without encountering any excessive steering reaction. Thus, advantages substantially identical to those of the first embodiment can be achieved.

Similarly, when the vehicle is travelling a road having ruts or water pools, the steering wheel 3 is turned or receives a steering reaction as a result of the reaction of the steerable wheels to such road irregularities, but because the actual yaw rate γ in this case also will substantially deviate from the reference yaw rate response model $\gamma_0$, the control action of the steering control system can automatically correct the course of the vehicle to the intended straight path.

Although the present invention has been described in terms of specific embodiments thereof, it is possible to modify and alter details thereof without departing from the spirit of the present invention. The scope of the invention is indicated by the appended claims rather than by the foregoing description of preferred embodiments.

What we claim is:

1. A vehicle steering control system, comprising:

steering torque input means;

powered steering control means for applying a first actuating torque to steerable wheels of a vehicle according to a steering torque applied to said steering torque input means;

means for detecting a lateral dynamic condition of said vehicle; and active reaction generating means for applying a second actuating torque to said steerable wheels so as to control a turning movement of said vehicle according to a signal supplied from said detecting means, said active reaction generating means applying said second actuating torque during all traveling conditions of the vehicle such that an appropriate steering reaction is applied to a steering wheel of the vehicle during said all traveling conditions of the vehicle;

whereby an overall actuating torque applied to said steerable wheels comprises a sum of said first and second actuating torques provided by said powered steering control means and said active reaction generating means.

2. A vehicle steering control system according to claim 1, wherein said second actuating torque provided by said active reaction generating means comprises a component which depends on a change rate of said lateral dynamic condition of said vehicle detected by said detecting means.

3. A vehicle steering control system according to claim 1, wherein a contribution of said second actuating torque to said overall actuating torque increases as a vehicle speed increases.

4. A vehicle steering control system according to claim 1, wherein said overall actuating torque applied to said steerable wheels consists of the sum of said first and second actuating torques.

5. A vehicle steering control system according to claim 1, wherein said second actuating torque provided by said active reaction generating means comprises a component which depends on a deviation of an actually detected lateral dynamic condition from a reference lateral dynamic condition which is predicted from a steering input to said steering torque input means.

6. A vehicle steering control system according to claim 1, wherein said lateral dynamic condition includes a yaw rate of said vehicle.

7. A vehicle steering control system according to claim 1, wherein said lateral dynamic condition includes a lateral acceleration of said vehicle.

8. A vehicle steering control system according to claim 1, wherein said active reaction generating means includes a steering force generating unit connected to a steering rod, the steering rod being operatively connected to said steerable wheels.

9. A vehicle steering control system according to claim 8, wherein said steering force generating unit comprises an electric motor and a ball screw mechanism.

10. A vehicle steering control system according to claim 1, wherein said powered steering control means and said active reaction generating means jointly comprise a steering force generating unit connected to a steering rod, the steering rod is operatively connected to the steerable wheels, and said steering force generating unit concurrently applies said first and second actuating torque to said steerable wheels as said overall actuated torque.

11. A vehicle steering control system according to claim 10, wherein said steering force generating unit comprises an electric motor and a ball screw mechanism.

12. A vehicle steering control system according to claim 10, wherein said steering torque input means applies a manual steering torque to said steerable wheels in addition to the overall actuating torque applied to the steerable wheels.

13. A vehicle steering control system, comprising:

steering torque input means;

lowered steering control means for applying a first actuating torque to steerable wheels of a vehicle according to a steering torque applied to said steering torque input means;

means for detecting a lateral dynamic condition of said vehicle;

active reaction generating means for applying a second actuating torque to said steerable wheels so as to control the turning movement of said vehicle according to a signal supplied from said detecting means, said active reaction generating means applying said second actuating torque during all traveling conditions of the vehicle;

whereby an overall actuating torque applied to said steerable wheels comprises a sum of said first and second actuating torques provided by said powered steering control means and said active reaction generating means; and said second actuating torque provided by said active reaction generating means being reduced as a steering angle of the vehicle increases.

14. A vehicle steering control system, comprising:

steering torque input means;

powered steering control means for applying a first actuating torque to steerable wheels of the vehicle according to a steering torque applied to said steering torque input means;

means for detecting a lateral dynamic condition of said vehicle;

active reaction generating means for applying a second actuating torque to said steerable wheels so as to control a turning movement of said vehicle according to a signal supplied from said detecting means, said active reaction generating means applying said second actuating torque during all traveling conditions of said vehicle;

whereby an overall actuating torque applied to said steerable wheels comprises a sum of said first and second actuating torques provided by said powered steering control means and said active reaction generating means; and said second actuating torque provided by said active reaction generating means being greater near a neutral point of said steering torque input means than in a larger steering angle range of said steering torque input means.

* * * * *

UNITED STATES PATENT AND TRADEMARK OFFICE
CERTIFICATE OF CORRECTION

PATENT NO. : 5,528,497
DATED : June 18, 1996
INVENTOR(S) : Yorihisa Yamamoto, Yutaka Nishi and Takashi Nishimori It is certified that error appears in the above-indentified patent and that said Letters Patent is hereby corrected as shown below:

Column 3, line 62, change "8*A)" to --8(A)--.

Column 4, approximately line 27, change "Steering" to --steering--.

Column 5, line 44, change "dθ/dr" to --dθ/dt--;

line 52, change "dθ/dr" to --dθ/dt--.

Column 6, line numbered 64, delete "an".

Column 7, line 13, change "wile" to --will--.

Column 8, line 4, change "dθ/dr" to --dθ/dt--;

line 14, change "dθ/dr" to --dθ/dt;

line 39, after "motor" insert --10--.

Column 10, 19th line, change "lowered" to --powered--.

Signed and Sealed this

Twenty-fourth Day of September, 1996

*Attest:*

BRUCE LEHMAN

*Attesting Officer*  *Commissioner of Patents and Trademarks*